(12) United States Patent
Kim et al.

(10) Patent No.: US 11,982,752 B2
(45) Date of Patent: May 14, 2024

(54) GPS ERROR CORRECTION METHOD THROUGH COMPARISON OF THREE-DIMENSIONAL HD-MAPS IN DUPLICATE AREA

(71) Applicant: MOBILTECH, Seoul (KR)

(72) Inventors: Jae Seung Kim, Goyang-Si (KR); Dong Hyun Suh, Suwon-si (KR)

(73) Assignee: MOBILTECH, Seoul (KR)

( * ) Notice: Subject to any disclaimer, the term of this patent is extended or adjusted under 35 U.S.C. 154(b) by 518 days.

(21) Appl. No.: 17/282,901

(22) PCT Filed: Apr. 29, 2020

(86) PCT No.: PCT/KR2020/005705
§ 371 (c)(1),
(2) Date: Apr. 5, 2021

(87) PCT Pub. No.: WO2021/132811
PCT Pub. Date: Jul. 1, 2021

(65) Prior Publication Data
US 2022/0091274 A1 Mar. 24, 2022

(30) Foreign Application Priority Data
Dec. 27, 2019 (KR) .......... 10-2019-0176169

(51) Int. Cl.
*G01S 19/40* (2010.01)
*G01C 21/32* (2006.01)
(Continued)

(52) U.S. Cl.
CPC .............. *G01S 19/40* (2013.01); *G01C 21/32* (2013.01); *G01S 17/89* (2013.01); *G06T 17/05* (2013.01);
(Continued)

(58) Field of Classification Search
CPC ........ G01S 19/40; G01S 19/485; G01S 17/89; G01C 21/32; G06T 17/05
See application file for complete search history.

(56) References Cited

U.S. PATENT DOCUMENTS

| 9,519,658 B2 * | 12/2016 | Davidson ............... G01C 21/30 |
| 2016/0178377 A1 * | 6/2016 | Jung ....................... G01S 19/13 |
| | | 701/468 |

(Continued)

FOREIGN PATENT DOCUMENTS

| KR | 10-1348941 B1 | 1/2014 |
| KR | 10-1442703 B1 | 9/2014 |

(Continued)

*Primary Examiner* — Peter M Bythrow
*Assistant Examiner* — Nazra Nur Waheed
(74) *Attorney, Agent, or Firm* — Bridgeway IP Law Group, PLLC; Jihun Kim (57) ABSTRACT

Proposed is a GPS error correction method performed through comparison of three-dimensional HD-maps in a duplicate area, and more particularly, a method that can calculate a correction value for a GPS error by comparing three-dimensional HD-maps of a corresponding duplicate area when the duplicate area is generated on a GPS route in the process of acquiring raw data to be used in a HD-map for autonomous driving. Particularly, in the method, an accurate correction value for the GPS error can be calculated by comparing three-dimensional point cloud data acquired by utilizing basically installed LiDAR, an Inertial Measurement Unit (IMU) and the like, without using expensive equipment such as a plurality of high-precision GPS receivers, stereo cameras or the like.

10 Claims, 11 Drawing Sheets
(5 of 11 Drawing Sheet(s) Filed in Color)

(51) Int. Cl.
  *G01S 17/89*   (2020.01)
  *G06T 17/05*   (2011.01)
  *G06V 10/74*   (2022.01)
  *G01S 19/07*   (2010.01)
  *G01S 19/48*   (2010.01)

(52) U.S. Cl.
  CPC .............. *G06V 10/74* (2022.01); *G01S 19/07* (2013.01); *G01S 19/485* (2020.05)

(56) References Cited

U.S. PATENT DOCUMENTS

| | | | |
|---|---|---|---|
| 2019/0129431 A1 | 5/2019 | Bacchet et al. | |
| 2019/0154842 A1* | 5/2019 | Adachi | G01C 21/36 |
| 2019/0265045 A1* | 8/2019 | Baik | G01C 21/3889 |
| 2020/0088882 A1* | 3/2020 | Shin | G06T 7/33 |
| 2020/0309960 A1* | 10/2020 | Arditi | G01S 19/45 |
| 2021/0108924 A1* | 4/2021 | Vedaste | G01C 21/3848 |
| 2021/0190537 A1* | 6/2021 | Gustafsson | G01C 21/3848 |

FOREIGN PATENT DOCUMENTS

| | | |
|---|---|---|
| KR | 10-1925862 B1 | 12/2018 |
| KR | 10-2019-0090999 A | 8/2019 |
| KR | 10-2019-0109625 A | 9/2019 |

* cited by examiner

GPS ERROR CORRECTION METHOD THROUGH COMPARISON OF THREE-DIMENSIONAL HD-MAPS IN DUPLICATE AREA

TECHNICAL FIELD

The present invention relates to a GPS error correction method through comparison of three-dimensional HD-maps in a duplicate area, and more particularly, to a method that can calculate a correction value for a GPS error by comparing three-dimensional HD-maps of a corresponding duplicate area when the duplicate area is generated on a GPS route in the process of acquiring raw data to be used in a HD-map for autonomous driving.

Particularly, the present invention relates to a GPS error correction method through comparison of three-dimensional HD-maps in a duplicate area, which can calculate an accurate correction value for a GPS error by comparing three-dimensional point cloud data acquired by utilizing basically installed LiDAR, an Inertial Measurement Unit (IMU) and the like, without using expensive equipment such as a plurality of high-precision GPS receivers, stereo cameras or the like.

BACKGROUND ART

Unmanned autonomous driving of a vehicle (autonomous vehicle) largely includes the step of recognizing a surrounding environment, the step of planning a driving route from the recognized environment, and the step of driving along the planned route, and the most essentially required thing in this process is a high-definition map (HD-Map).

The HD-Map is map data of a three-dimensional point cloud form generated using LiDAR, an Inertial Measurement Unit (IMU), and a GPS sensor, which is a map in which information on the surrounding environment, such as roads, elevation of terrains, curvatures and the like, is implemented three-dimensionally, and particularly contains various information needed for driving on a road.

For example, the HD-Map includes various types of information needed for driving on a road, such as lanes of the road, driving directions, intersections, signs, traffic lights, speed limits and the like.

Accordingly, an autonomous vehicle runs on a road based on the HD-Map while recognizing the surrounding environment using a technique such as 'Road information detection method for unmanned vehicle, and unmanned vehicle using the same' disclosed in Korean Patent Publication No. 10-1348941, which is a prior art document described below.

As described, the HD-Map is a most basic item in the field of autonomous driving, and in addition, it is natural that the most accurate information is required for safe autonomous driving.

Generally, a HD-Map is manufactured largely through four steps of work planning, data acquisition, point cloud data generation, and object drawing and editing.

Among them, the more important steps are the data acquisition step and the point cloud data generation step, and acquisition of accurate data and generation of accurate point cloud data based on the accurate data are the most fundamental and important steps in the field of autonomous driving.

Meanwhile, since three-dimensional points collected through LiDAR are merely three-dimensional information of the surrounding environment based on the LiDAR, input of additional information is needed in addition to the LiDAR points to make a HD-Map.

In other words, in order for the HD-Map to be accurately expressed on a GPS route, the time zone of the GPS route and the time zone of the data collected through the LiDAR are compared, and three-dimensional points collected through the LiDAR are displayed on the GPS route in an overlapping time zone.

At this point, through synchronization of an IMU sensor, the three-dimensional points collected through the LiDAR are calculated as a global coordinate value for the environment on the GPS route.

However, a GPS value for grasping a location using a signal received through a satellite has an error that occurs when a significant obstacle factor exists in the neighborhood or strength of GPS signal is weak, and such an error may be fatal in a field that requires high precision, such as autonomous driving or three-dimensional space search.

DISCLOSURE OF INVENTION

Technical Problem

Therefore, the present invention has been made in view of the above problems, and it is an object of the present invention to provide a GPS error correction method through comparison of three-dimensional HD-maps in a duplicate area, which can calculate a correction value for a GPS error by comparing three-dimensional HD-maps of a corresponding duplicate area when the duplicate area is generated on a GPS route in the process of acquiring raw data to be used in a HD-map for autonomous driving.

Particularly, another object of the present invention is to provide a GPS error correction method through comparison of three-dimensional HD-maps in a duplicate area, which can calculate an accurate correction value for a GPS error by comparing three-dimensional point cloud data acquired by utilizing basically installed LiDAR, an Inertial Measurement Unit (IMU) and the like, without using expensive equipment such as a plurality of high-precision GPS receivers, stereo cameras or the like.

In addition, another object of the present invention is to provide a GPS error correction method through comparison of three-dimensional HD-maps in a duplicate area, which can quickly calculate a correction value that can guarantee accuracy by removing a floor surface or noise (e.g., leaves tumbling in the wind, etc.) and comparing meaningful objects in the process of comparing three-dimensional point cloud data of the duplicate area.

Technical Solution

To accomplish the above objects, according to one aspect of the present invention, there is provided a GPS error correction method through comparison of three-dimensional HD-maps in a duplicate area, the method comprising: a duplicate path confirmation step of confirming a duplicate path in which a duplicate movement event of passing through any one path on an entire GPS route at least twice has occurred; a three-dimensional HD-map generation step of generating a three-dimensional HD-map for each movement along the duplicate path in which a duplicate movement event has occurred; and a correction value calculation step of calculating a correction value for an error in GPS coordinates by comparing the three-dimensional HD-maps for each movement.

In addition, the duplicate path confirmation step may include: a unit area setting process of setting the entire GPS route as a plurality of unit areas; a duplicate area confirmation process of confirming a duplicate area in which a duplicate movement event has occurred among the unit areas; and a duplicate path confirmation process of confirming a path in the duplicate area as a duplicate path.

In addition, the unit area setting process may include: a GPS route flattening process of removing Z-axis coordinates from the GPS coordinates of the entire GPS route; an entire area confirmation process of confirming an entire size of the X-axis and the Y-axis of the flattened GPS route; and an area partitioning process of partitioning an entire area into unit areas of a predetermined ratio based on the entire size.

In addition, the duplicate area confirmation process may include: a GPS coordinates time-series process of arranging GPS coordinates in a specific unit area in chronological order; and a duplicate area extraction process of extracting a corresponding area as a duplicate area when an abrupt time difference is confirmed in at least some of time-series GPS coordinates.

In addition, the three-dimensional HD-map generation step may include: a GPS coordinate collection process of collecting GPS coordinates for each movement; a point cloud data collection process of collecting point cloud data for each movement; a data matching process of confirming information of the same time zone by comparing time zones of the GPS coordinates and the point cloud data; and a global coordinate application process of transforming matched point cloud data into matched GPS coordinates.

In addition, the correction value calculation step may include: a target map determination process of determining any one to be compared among the three-dimensional HD-maps of each movement as a target map; a source map determination process of determining another one to be compared among the three-dimensional HD-maps of each movement as a target map; and a map matching process of matching the source map and the target map.

In addition, the correction value calculation step may further include, before the target map determination process, a standard deviation calculation process of calculating an average distance and a standard deviation of the point cloud data constituting the three-dimensional HD-map, wherein the target map determination process may determine a HD-map having a relatively small standard deviation, among the three-dimensional HD-maps of each movement to be compared, as a target map, and the source map determination process may determine a HD-map having a relatively large standard deviation, among the three-dimensional HD-maps of each movement to be compared, as a source map.

In addition, the correction value calculation step may further include, between the source map determination process and the target map determination process, a preprocessing process of removing point cloud data of floor surface and point cloud data of noise among the point cloud data constituting the three-dimensional HD-map.

In addition, the map matching process may include: a matching coordinate search process of searching for nearest GPS coordinates on the target map for all three-dimensional GPS coordinates on the source map; and a matrix calculation process of calculating a 'Rotation' matrix and a 'Translation' matrix for transforming specific GPS coordinates of the source map into GPS coordinates of the target map that matches the specific GPS coordinates.

In addition, the correction value calculation step may further include a correction value calculation process of calculating X, Y, Z change values of the 'Translation' matrix among the calculated matrixes as a correction value for the error in the GPS coordinates.

Advantageous Effects

BY the solutions described above, the present invention has an advantage of calculating a correction value for a GPS error by comparing three-dimensional HD-maps of a corresponding duplicate area when the duplicate area is generated on a GPS route in the process of acquiring raw data to be used in a HD-map for autonomous driving.

Through this, the present invention may further improve the accuracy, efficiency, and reliability of the HD-map for autonomous driving.

Particularly, the present invention has an advantage of calculating an accurate correction value for a GPS error by comparing three-dimensional point cloud data acquired by utilizing basically installed LiDAR, an Inertial Measurement Unit (IMU) and the like, without using expensive equipment such as a plurality of high-precision GPS receivers, stereo cameras or the like.

In other words, since an accurate correction value for a GPS error can be calculated without requiring expensive equipment or additional configurations, the present invention has an advantage of securing improved competitiveness in both the aspects of data accuracy and cost.

In addition, the present invention has an advantage of quickly calculating a correction value that can guarantee accuracy by removing a floor surface or noise (e.g., leaves tumbling in the wind, etc.) and comparing meaningful objects in the process of comparing three-dimensional point cloud data of the duplicate area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Examples of a GPS error correction method through comparison of three-dimensional HD-maps in a duplicate area according to the present invention may be diversely applied, and hereinafter, a most preferred embodiment will be described with reference to the accompanying drawings.

Figure 1:
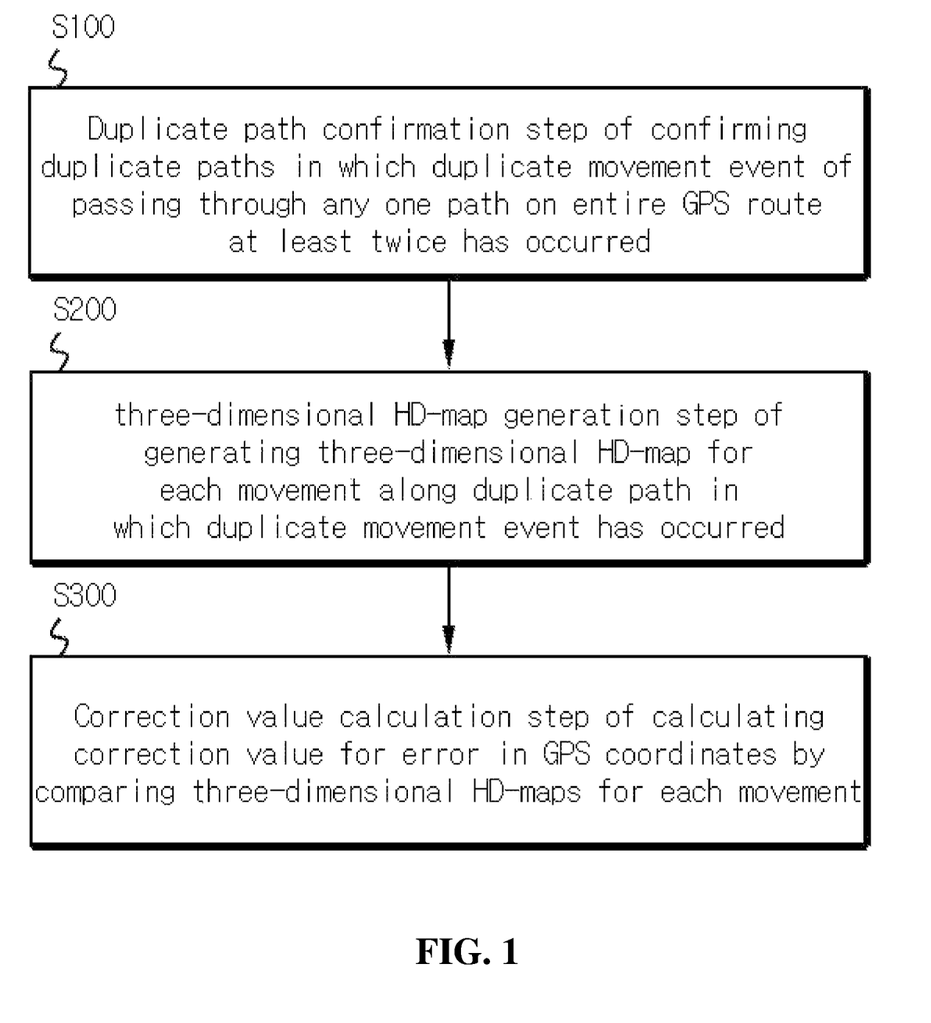
FIG. 1 is a flowchart illustrating an embodiment of a GPS error correction method through comparison of three-dimensional HD-maps in a duplicate area according to the present invention.

FIG. 1 is a flowchart illustrating an embodiment of a GPS error correction method through comparison of three-dimensional HD-maps in a duplicate area according to the present invention.

Referring to FIG. 1, a GPS error correction method through comparison of three-dimensional HD-maps in a duplicate area includes a duplicate path confirmation step (S100), a three-dimensional HD-map generation step (S200), a correction value calculation step (S300).

At the duplicate path confirmation step (S100), a duplicate path in which a duplicate movement event of passing through any one path on the entire GPS route at least twice has occurred is confirmed.

For example, after dividing the entire GPS route into a plurality of grid cells, whether a duplicate movement has occurred in each grid cell area may be confirmed, and the corresponding area may be set as a duplicate area.

At the three-dimensional HD-map generation step (S200), a three-dimensional HD-map for each movement along a duplicate path in which a duplicate movement event has occurred is generated.

For example, a three-dimensional HD-map may be generated for the case of passing through a duplicate area, and as a result, three-dimensional HD-maps as many as the number of passing through the duplicate area may be generated.

At the correction value calculation step (S300), a correction value for an error in GPS coordinates is calculated by comparing the three-dimensional HD-maps for each movement.

For example, a correction value for an error in GPS coordinates may be calculated through a process of comparing three-dimensional point cloud data for each movement and matching the point cloud data.

Hereinafter, each of the steps shown in FIG. 1 will be described in more detail.

Figure 2:
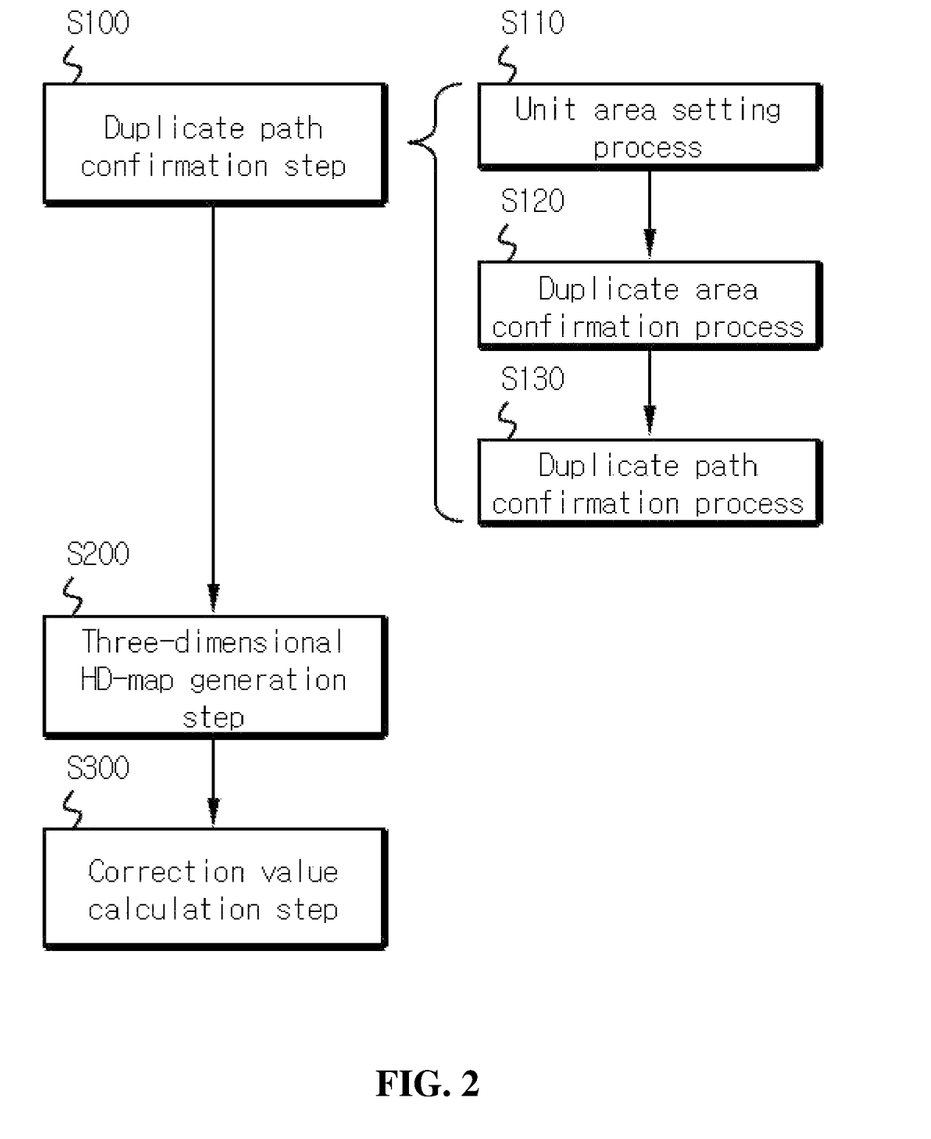
FIG. 2 is a flowchart illustrating a specific embodiment of step S100 shown in FIG. 1.
Figure 3:
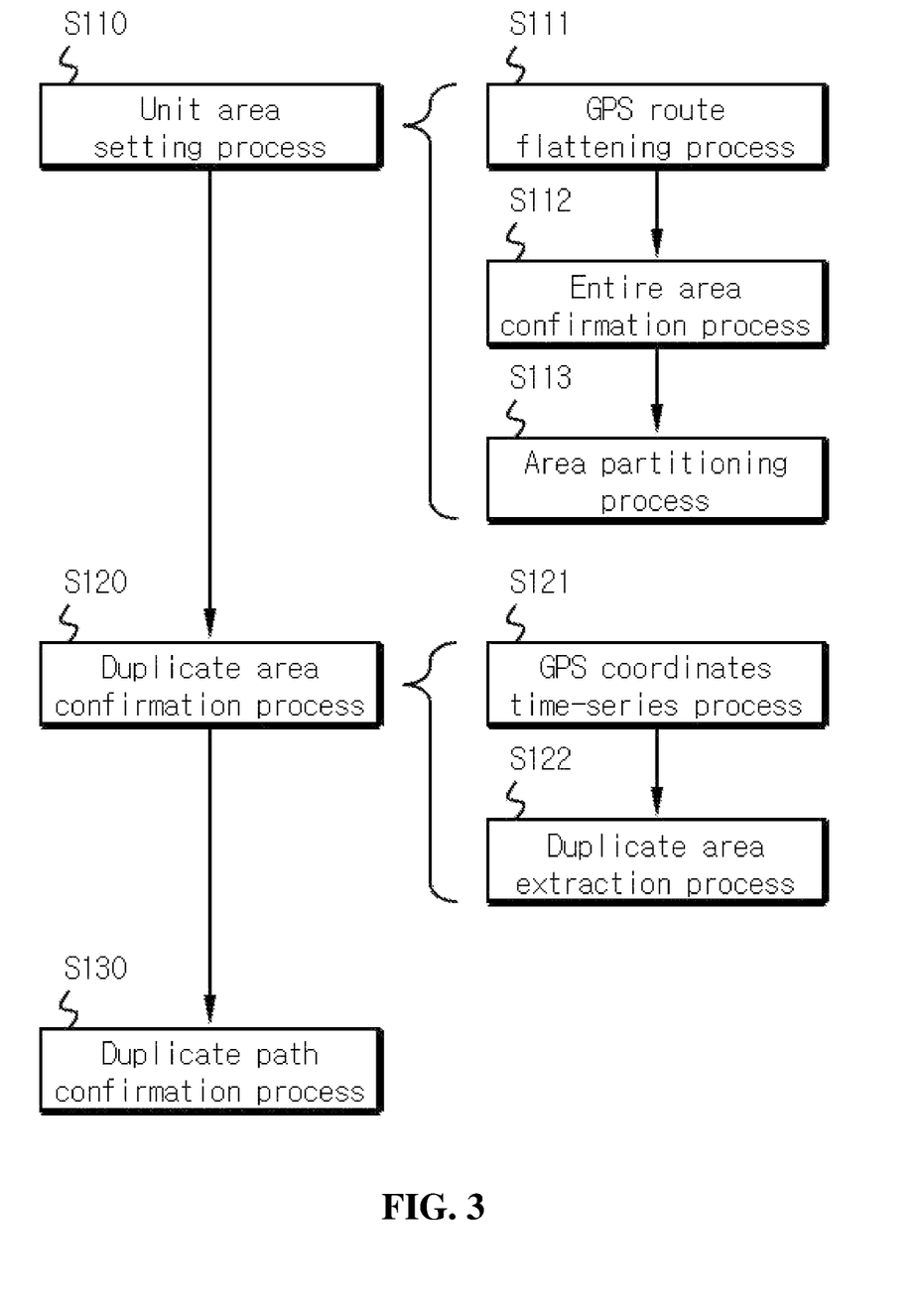
FIG. 3 is a flowchart illustrating a specific embodiment of processes S110 and S120 shown in FIG. 2.

FIG. 2 is a flowchart illustrating a specific embodiment of step S100 shown in FIG. 1, and FIG. 3 is a flowchart illustrating a specific embodiment of processes S110 and S120 shown in FIG. 2.

Referring to FIG. 2, the duplicate path confirmation step (S100) may include a unit area setting process (S110) of setting an entire GPS route as a plurality of unit areas, a duplicate area confirmation process (S120) of confirming a duplicate area in which a duplicate movement event has occurred among the unit areas, and a duplicate path confirmation process (S130) of confirming a path in the duplicate area as a duplicate path.

In addition, the unit area setting process (S110) may include a GPS route flattening process (S111) of removing Z-axis coordinates from the GPS coordinates of the entire GPS route, an entire area confirmation process (S112) of confirming the entire size of the X-axis and the Y-axis of the flattened GPS route, and an area partitioning process (S113) of partitioning the entire area into unit areas of a predetermined ratio based on the entire size.

In addition, the duplicate area confirmation process (S120) may include a GPS coordinates time-series process (S121) of arranging GPS coordinates in a specific unit area in chronological order, and a duplicate area extraction process (S122) of extracting a corresponding area as a duplicate area when an abrupt time difference is confirmed in at least some of the time-series GPS coordinates.

Figure 7:
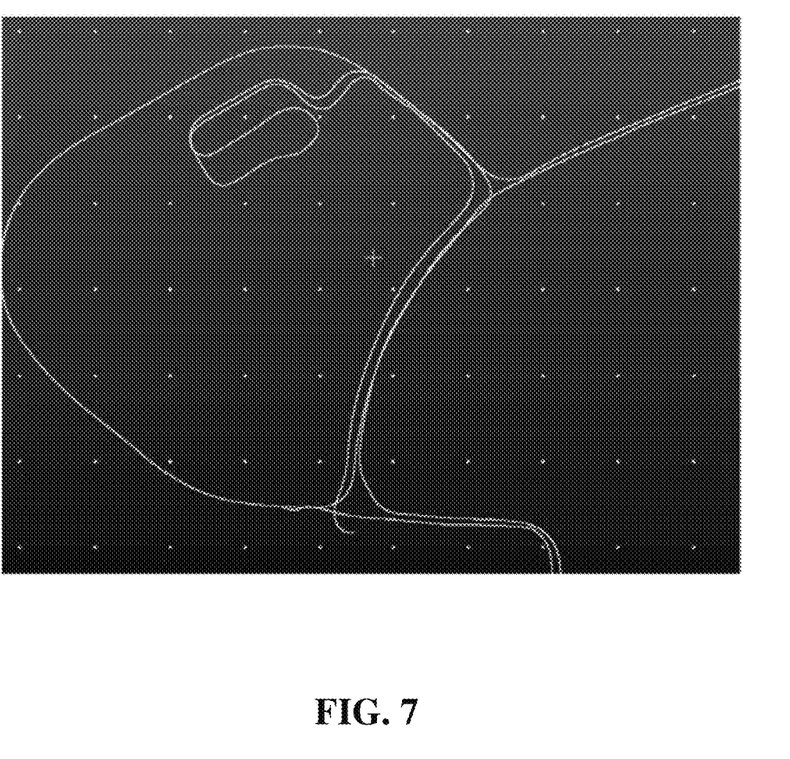
FIGS. 7 to 11 are views imaged to describe the present invention.

For example, as shown in FIG. 7, a GPS route (white line) may be divided into a set of grid cells (S110). At this point, each grid cell is a region of interest and may determine whether an intersecting event (or duplicity, hereinafter, interchangeably used) occurs in a corresponding area.

At this point, all the GPS values are expressed in a 'top-view' method by removing z-axis values (S111), and x-axis and y-axis values may be included in a corresponding grid cell (S112), and the size of a grid cell may be set differently according to the x-axis and y-axis lengths of the entire GPS route (S113).

For example, when the x-axis and y-axis lengths of the entire GPS route are relatively long within the same time, it means that the moving radius of a corresponding object is large, and an intersecting event may be searched by increasing the size of grid cell. On the other hand, when the size of the grid cell is increased in the case where the moving radius of an object is small, a correct intersecting event is included in one grid cell and may not be searched.

In the present invention, a test has been conducted by dividing an area having a distance of about 6752.47 m in the x-axis and a distance of about 7802.84 m in the y-axis into grid cells, and in a corresponding test area, it is confirmed that the entire GPS route is properly divided when the grid cell is a square having a size of 20 m on one side. That is, 6752.47/20=337.6, i.e., 338, 'segments' are generated on the x-axis, and 7802.84/20=390.1, i.e., 391, 'segments' are generated on the y-axis.

In addition, the method of searching for an intersecting event in a grid cell (S120) is capturing a moment when time change of a GPS value abruptly occurs, and after arranging GPS values included in a grid cell in chronological order (S121), it may be determined that an intersecting event has occurred in the grid cell when an abrupt time difference larger than a predetermined threshold value occurs between successive GPS values (S122).

This may be expressed as shown in Equation 1.

$$gps(t+1) \cdot time - gps(t) \cdot time > threshold => \text{intersecting segment(grid cell)} \quad \text{(Equation 1)}$$

When a number of time differences like this occur, it may be interpreted that a plurality of intersecting events has occurred.

Figure 8:
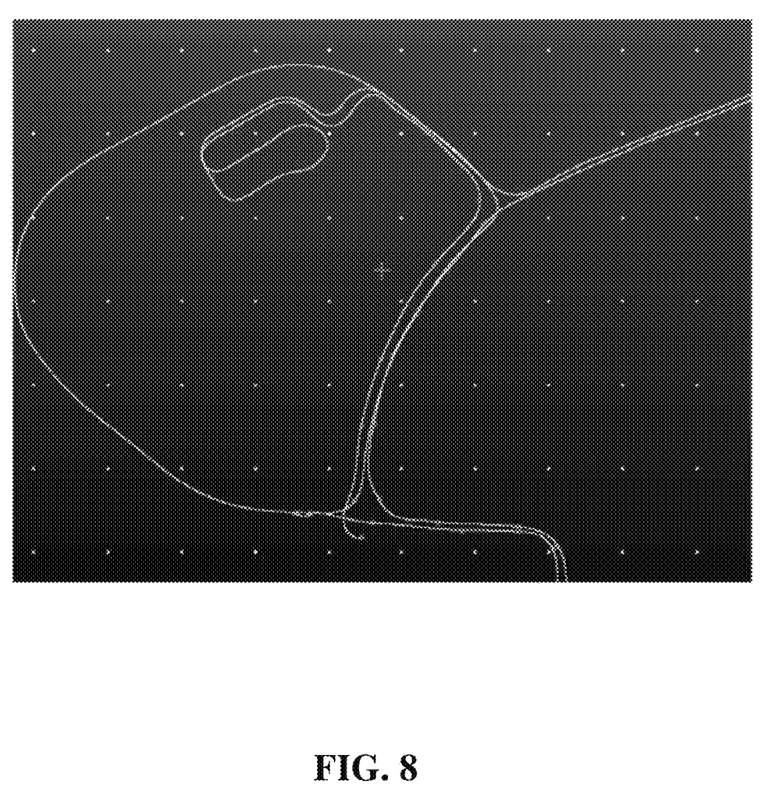

When the intersecting event is displayed as a red dot on the entire GPS route, it may appear as shown in FIG. 8 (S130), and since one intersecting event requires two movement paths, the intersecting event may occur in one grid cell as many times as (red dot)/2.

Figure 4:
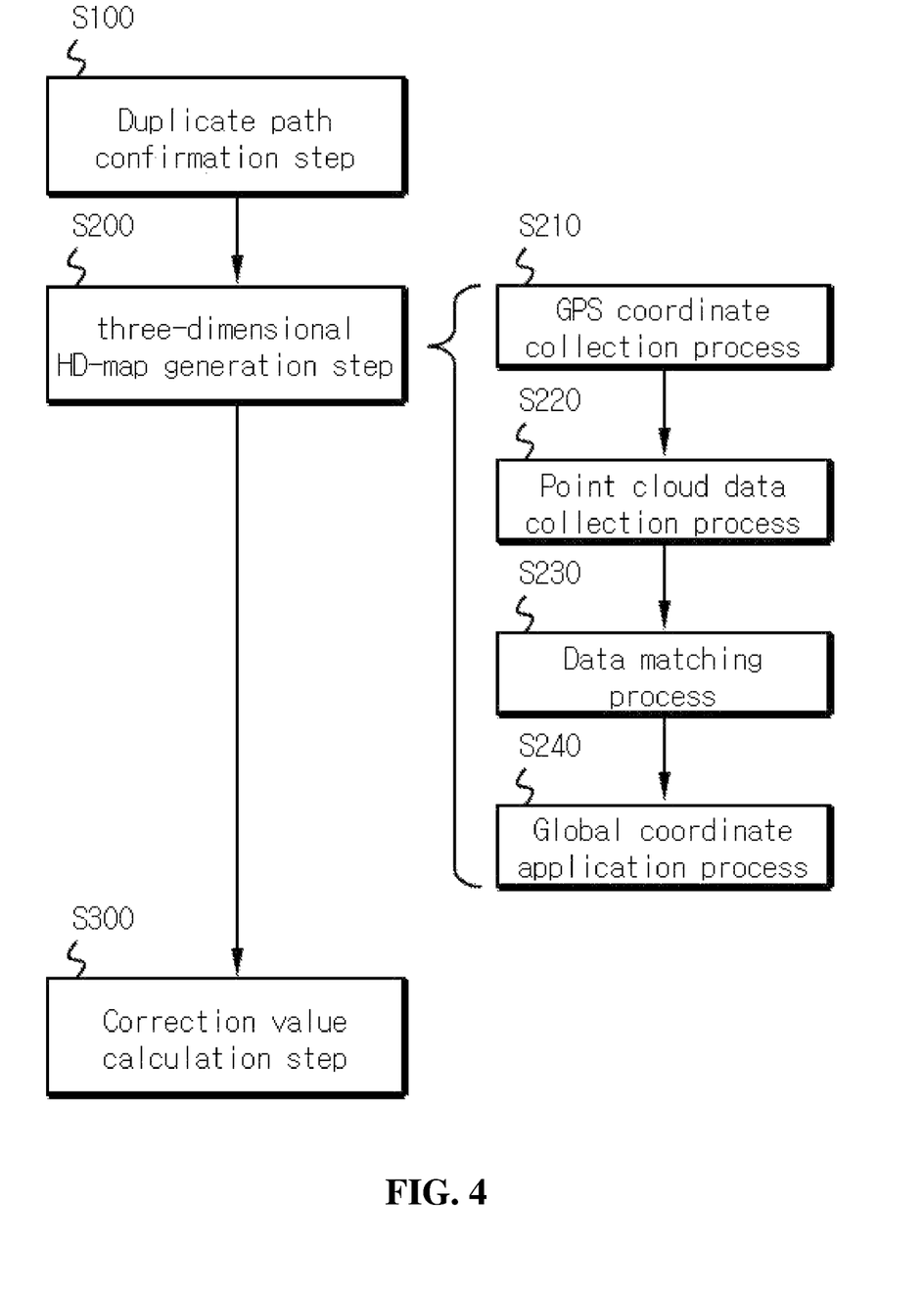
FIG. 4 is a flowchart illustrating a specific embodiment of step S200 shown in FIG. 1.

FIG. 4 is a flowchart illustrating a specific embodiment of step S200 shown in FIG. 1.

Referring to FIG. 4, the three-dimensional HD-map generation step (S200) may include a GPS coordinate collection process (S210) of collecting GPS coordinates for each movement, a point cloud data collection process (S220) of collecting point cloud data for each movement, a data matching process (S230) of confirming information of the same time zone by comparing the time zones of the GPS coordinates and the point cloud data, and a global coordinate application process (S240) of transforming matched point cloud data into matched GPS coordinates.

For example, after dividing the entire GPS route into grid cells, a three-dimensional HD-map can be generated only for a grid cell in which the intersecting event has occurred in a previous process.

At this point, since at least two moving paths occur in a grid cell in which an intersecting event has occurred, at least two three-dimensional HD-maps may be generated.

Specifically, when it is assumed that one intersecting event has occurred, two moving paths are generated, and a GPS value of each moving path may be collected (S210).

Then, matching three-dimensional points (point cloud data) may be collected by comparing the time zone of a corresponding GPS route with the time zone of data collected through the LiDAR (S220).

Finally, after matching the three-dimensional points collected through the LiDAR and the GPS value through synchronization of the IMU sensor (S230), the three-dimensional points may be calculated as a global coordinate value for the environment on each moving path (S240).

Here, the formula for transforming the LiDAR coordinate value into a global coordinate value through synchronization of the IMU sensor is as shown in Equations 2 to 5.

$$RortationMatrix(\alpha, \beta, \gamma) = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \quad \text{(Equation 2)}$$

Here, RotationMatrix($\alpha,\beta,\gamma$) denotes a rotation matrix using Euler angles, $\alpha$ denotes a z-axis rotation, $\beta$ denotes a y-axis rotation, and $\gamma$ denotes a z-axis rotation.

Point in World Coordinate(3×1 matrix): $W=(x_{world}, y_{world}, z_{world})$

Point in LiDar(3×1 matrix): $L=(x_{lidar}, y_{lidar}, z_{lidar})$ checkpoint GPS data(3×1 matrix): $G=(easting_{ckpt}, northing_{ckpt}, up_{ckpt})$ checkpoint Rotation data(3×1 matrix): $R_{ckpt}= (yaw_{ckpt}, pitch_{ckpt}, roll_{ckpt})$     (Equation 3)

LiDAR to IMU rotation (3×3 matrix): $R_{L21}$

LiDAR to IMU translation (3×1 matrix): $T_{L21}$

IMU to World rotation (3×3 matrix):
$R_{I1W}$=RotationMatrix($\pi$,0,$\pi$/2)     (Equation 4)

$R_{I2W}R_{ckpt}R_{L21}(L-T_{L21})+G=W$     (Equation 5)

Figure 9:
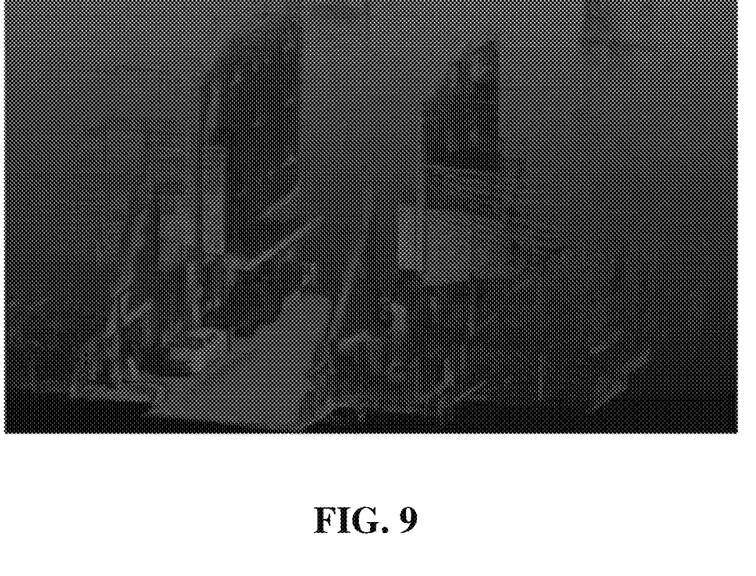

When a three-dimensional HD-map is generated for one intersecting event in a way as described above, it is visualized in the form as shown in FIG. 9. At this point, the three-dimensional HD-maps of different time zones (red and blue) are not matched but distorted due to a GPS error although the space is the same.

Figure 5:
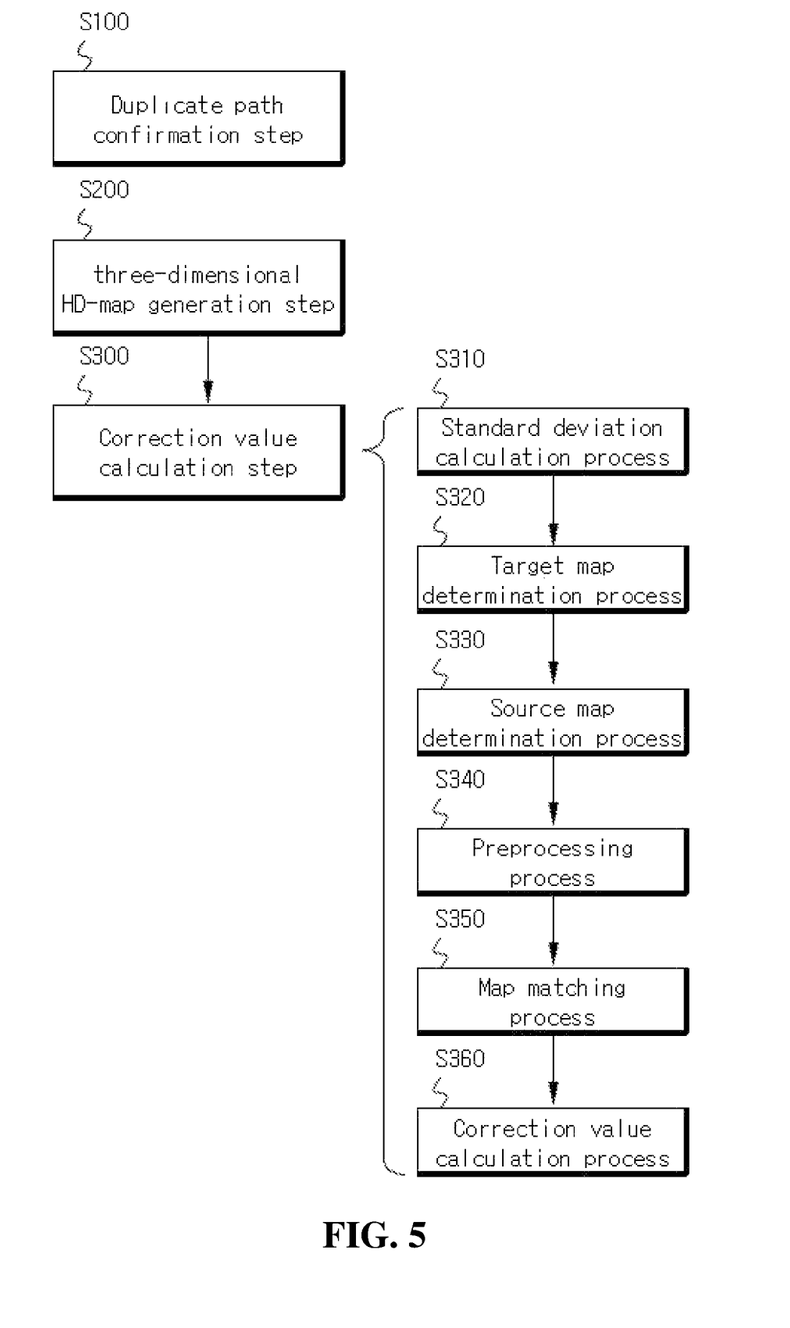
FIG. 5 is a flowchart illustrating a specific embodiment of step S300 shown in FIG. 1.
Figure 6:
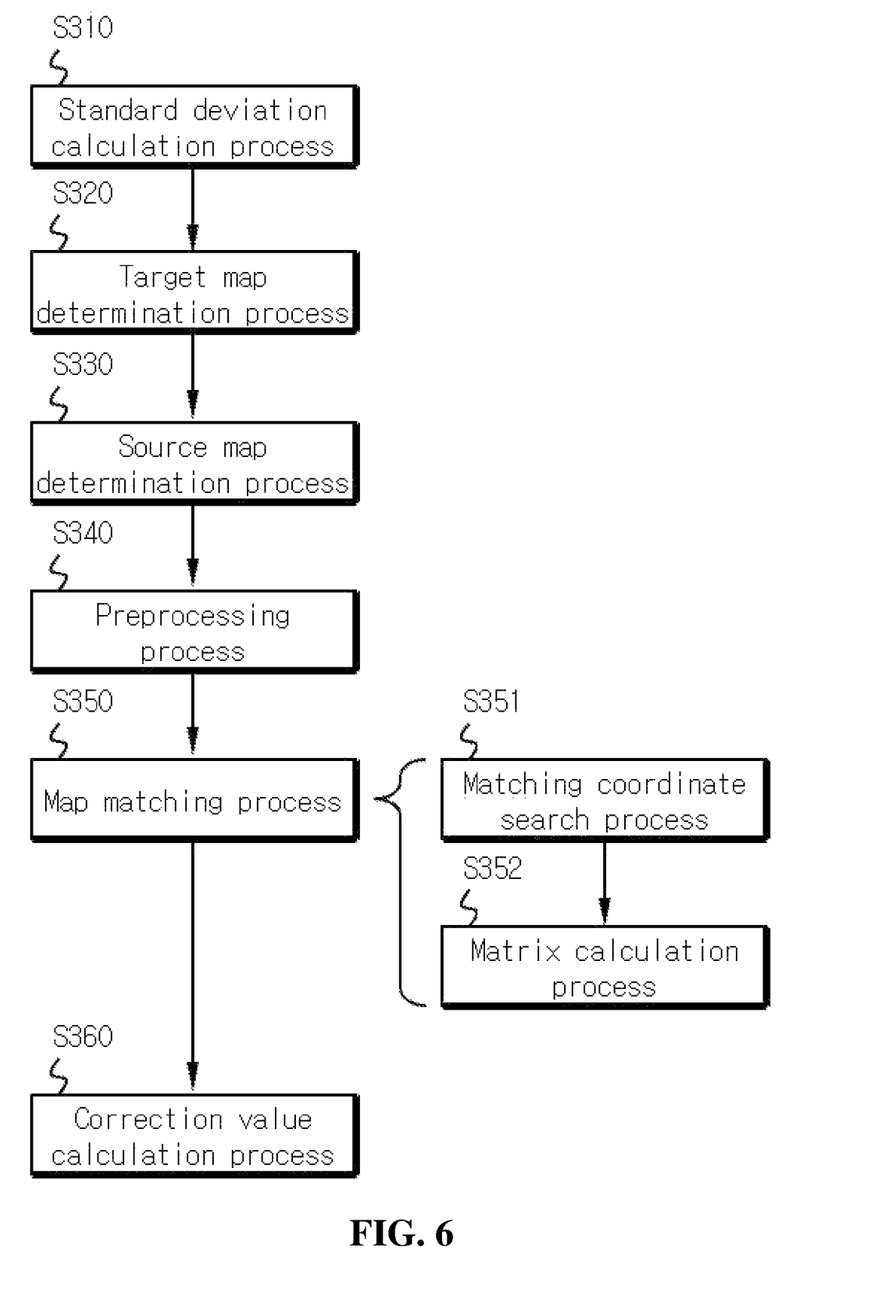
FIG. 6 is a flowchart illustrating a specific embodiment of step S350 shown in FIG. 5.

FIG. 5 is a flowchart illustrating a specific embodiment of step S300 shown in FIG. 1, and FIG. 6 is a flowchart illustrating a specific embodiment of step S350 shown in FIG. 5.

Referring to FIG. 5, the correction value calculation step (S300) may include a target map determination process (S320) of determining any one to be compared among the three-dimensional HD-maps of each movement as a target map, a source map determination process (S330) of determining another one to be compared among the three-dimensional HD-maps of each movement as a target map, and a map matching process (S350) of matching the source map and the target map.

At this point, a standard deviation calculation process (S310) of calculating an average distance and a standard deviation of the point cloud data constituting the three-dimensional HD-map may be further included before the target map determination process (S320), and among the three-dimensional HD-maps of each movement to be compared, a HD-map having a relatively small standard deviation may be determined as a target map (S320), and a HD-map having a relatively large standard deviation may be determined as a source map (S330).

In addition, after performing the source map determination process (S330) and before performing the map matching process (S350), a preprocessing process (S340) of removing point cloud data of floor surface and point cloud data of noise among the point cloud data constituting the three-dimensional HD-map may be performed.

In addition, the map matching process (S350) may include a matching coordinate search process (S351) of searching for nearest GPS coordinates on the target map for all three-dimensional GPS coordinates on the source map, and a matrix calculation process (S352) of calculating a 'Rotation' matrix and a 'Translation' matrix for transforming specific GPS coordinates of the source map into GPS coordinates of the target map that matches the specific GPS coordinates.

Finally, at a correction value calculation process (S360) performed after the map matching process (S350), X, Y, Z change values of the 'Translation' matrix among the calculated matrixes may be calculated as a correction value for the error in the GPS coordinates.

For example, when two three-dimensional HD-maps are generated for one intersecting event, a 'Target' and a 'Source' should be selected. The 'Target' means a reference point that does not move when matching two three-dimensional HD-maps, and the 'Source' means an object that matches the 'Target' through 'Transform'.

In the present invention, selection of the source and the target may be determined using the standard deviation of the GPS value (S310).

The standard deviation of a GPS value is an index indicating how accurate a received value of GPS is, and in FIG. 9, since the average standard deviation of GPS value of the blue three-dimensional HD-map is smaller than the average standard deviation of GPS value of the red three-dimensional HD-map, it may be determined as a target (S320).

When a target is selected in this way, the remaining red three-dimensional HD-map becomes a source (S330) and may match the blue three-dimensional HD-map.

At this point, before matching the two three-dimensional HD-maps, a preprocessing operation may be performed on the point cloud data (S340).

In the present invention, in order to increase the operation speed for the point cloud data and eliminate unnecessary calculations, point cloud data of floor surface and a small number of point cloud data of noise may be removed through a preprocessing process.

First, in the case of the floor surface, point cloud data having a height smaller than a predetermined value may be selected and removed by applying a 'Conditional Removal' filter of PCL.

Specifically, when three-dimensional points of LiDAR are spread on a GPS route, if a calculated global coordinate value is smaller than the height of the GPS receiver, it may be determined as a floor surface.

This is expressed as a pseudo code shown below:

```
for (point) in (lidar-points)
{
```

-continued

```
calc point to global_point;
if(global_point.z < gps.height)
    delete point;
else
    add point;
}
```

Next, a small number of point cloud data of noise may be deleted by applying a 'Statistical Outlier Removal' filter of PCL including Source 1 shown below.

(Source 1)
For every point $P_i$ in the three-dimensional point cloud.
    Find the location of the k nearest neighbors to Point $P_i$(their indexes in the cloud)
    Compute the average distance $d_i$ from point $P_i$ to its k nearest neighbors
    Compute the mean d of the distances $d_i$
    Compute the standard deviation $\sigma_d$ of the distances $d_i$
    Compute the threshold $T=\mu_d+\alpha\cdot\sigma_d$
    Eliminate points in the cloud for which the average distance to its k nearest neighbors is at a distance d>T A corresponding filter may calculate an average distance of k neighboring LiDAR points for all LiDAR points, and calculate the overall average and the standard deviation of the average distances (S310).

When the average distance of a LiDAR point, among the LiDAR points, deviates from the overall average distance by more than the value of standard deviation, the LiDAR point may be determined as a noise and may be deleted.

Figure 10:
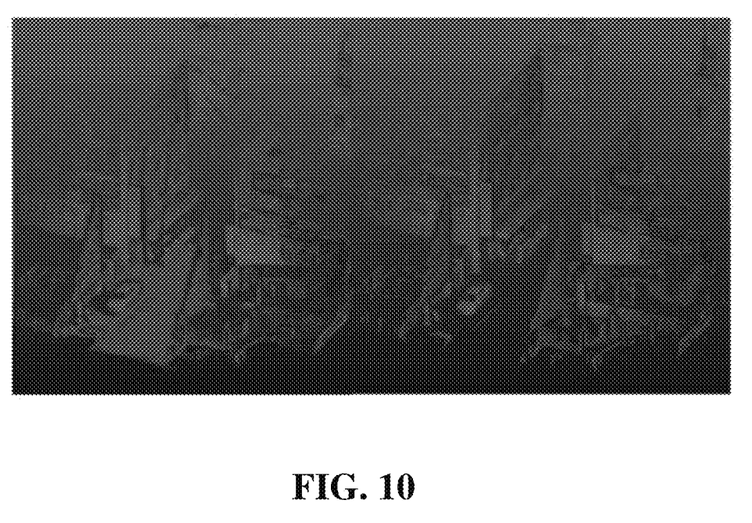

That is, a corresponding filter may search for a small number of point cloud data having a small density, and a three-dimensional HD-map that has passed through the two filters may show a refined result as shown in FIG. 10.

In this way, matching of the two three-dimensional HD-maps that have completed the preprocessing process may be performed using the 'Iterative Closest Point (ICP)' algorithm of PCL including Source 2 shown below.

(Source 2)
(1) Calculate the corresponding point $M_i^k \in M^k$ in the reference set M so that $\|M_i^k - S_i^k\| = \min$;
(2) Calculate the rotation matrix $R^k$ and the translation vector $T^k$ so that $\Sigma_{i=1}^{N} \|R^k S_i^k + T^k - M_i^k\|^2 = \min$;
(3) Calculate $S^{k+1}\{S_i^{k+1} | S_i^{k+1} = R^k S_i^k + T^k, S_i^k \in S\}$;
(4) Calculate $d^{k+1} = \Sigma_{i=1}^{N} \|S_i^{k+1} - M_i^k\|^2$
(5) If $d^{k+1}$ is not less than the given T value, return (1) until $d^{k+1} < \tau$ or iterations k is greater than the preset maximum number of iterations.

As shown in Source 2, for the three-dimensional HD-map, the principle of a corresponding algorithm is searching for nearest three-dimensional coordinates in the three-dimensional HD-map, which is the 'Target', for all three-dimensional coordinates, and calculating 'Rotation' and 'Translation' matrixes for corresponding transform.

This process is repeated n times that is set as a threshold value, and as soon as the difference of distance between the three-dimensional HD-maps becomes lower than the 'Threshold', the repetition is stopped, and the result may be output.

As described above, since a corresponding algorithm make a calculation for all three-dimensional points, an excessive amount of calculation is inevitably required unless noise and the floor surface are removed through the preprocessing process (S340) as described above.

On the other hand, generally, since it is not common for the LiDAR or the GPS receiver to be upside down and the direction is reversed and there is no significant change, the Rotation matrix is not used.

Accordingly, the x, y, z change values of the 'Translation' matrix, among the 'Rotation' and 'Translation' matrixes obtained through the ICP algorithm as described above, may be used as a correction value for the GPS error (S360).

Figure 11:
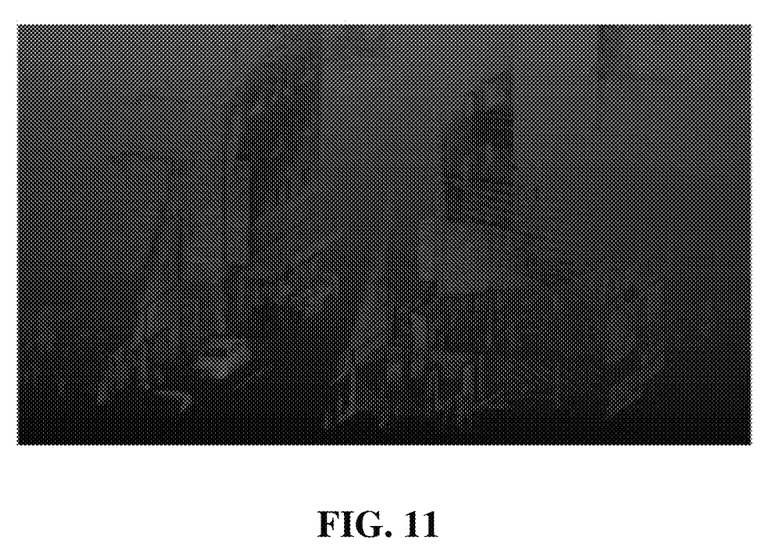

FIG. 11 shows a result of matching three-dimensional HD-maps using an ICP algorithm after applying filters for removing the point cloud data of floor surface and a small number of point cloud data of noise to the two three-dimensional HD-maps in which the intersecting event of FIG. 9 has occurred.

In FIG. 9, the three-dimensional HD-map of 'Source' has a difference of 8 cm on the x-axis, −7 cm on the y-axis, and −32 cm on the z-axis, compared with the three-dimensional HD-map of 'Target'.

Although a corresponding space is the same location in different time zones, it may be interpreted that the GPS value on the red three-dimensional HD-map is inaccurately measured due to an error.

Therefore, it needs to correct the red GPS value based on the relatively accurate blue GPS value.

FIG. 11 is a view showing a result visualized after moving the red three-dimensional HD-map as much as the skewed values of the x-axis, y-axis, and z-axis as described above.

Accordingly, a degree of the three-dimensional HD-map skewed in the x-axis, y-axis, and z-axis may be determined as a correction value for a GPS error (S360).

A GPS error correction method through comparison of three-dimensional HD-maps in a duplicate area according to the present invention has been described above. It will be appreciated that those skilled in the art may implement the technical configuration of the present invention in other specific forms without changing the technical spirit or essential features of the present invention.

Therefore, it should be understood that the embodiments described above are illustrative and not restrictive in all respects.

INDUSTRIAL APPLICABILITY

The present invention can be applied in the field of autonomous driving, road recognition, high-precision road maps for autonomous driving, as well as in the similar or related fields, and may improve the reliability and competitiveness of products and systems in the field.

The invention claimed is:

1. A method of aiding autonomous driving through GPS (Global Positioning System) error correction, the method comprising:
    a duplicate path confirmation step of confirming a duplicate path in passing through an entire GPS route of a predetermined area through which a vehicle drives to generate the entire GPS route, wherein the duplicate path is a segment of the entire GPS route through which the vehicle moves at least twice and is detected via detecting one or more duplicate movement events during each of which the vehicle passed through the segment at least twice, wherein the entire GPS route comprises a plurality of GPS coordinates along the entire GPS route;
    a three-dimensional HD-map (High Definition map) generation step of generating a three-dimensional HD-map for each of the one or more duplicate movement events along the duplicate path based on three-dimensional point cloud data acquired from sensors including LiDAR (Light Detection and Ranging) and IMU (Inertial Measurement Unit), wherein the three-dimensional HD-map comprises data representing contour lines for elevation in addition to X-Y coordinates representing locations; and a correction value calculation step of calculating a correction value for an error in the plurality of GPS coordinates along the duplicate path by comparing, for each of the one or more duplicate movement events along the duplicate path, data in the three-dimensional HD-map corresponding to each of the one or more duplicate movement events along the duplicate path, with GPS coordinates in the entire GPS route corresponding to each of the one or more duplicate movement events along the duplicate path, incorporating the correction value for the error in the GPS coordinates along the duplicate path into the entire GPS route of the predetermined area to form a corrected GPS route; and an application step of applying the corrected GPS route in an autonomous driving.

2. The method according to claim 1, wherein the duplicate path confirmation step includes:
a unit area setting process of setting the entire GPS route as a plurality of unit areas;
a duplicate area confirmation process of confirming a duplicate area in which a duplicate movement event has occurred among the plurality of unit areas; and
a duplicate path confirmation process of confirming a path in the duplicate area as a duplicate path.

3. The method according to claim 2, wherein the unit area setting process includes:
a GPS route flattening process of removing Z-axis coordinates from the GPS coordinates of the entire GPS route;
an entire area confirmation process of confirming an entire size of an X-axis and an Y-axis of the flattened GPS route; and
an area partitioning process of partitioning an entire area into unit areas of a predetermined ratio based on the entire size.

4. The method according to claim 2, wherein the duplicate area confirmation process includes:
a GPS coordinates time-series process of arranging GPS coordinates in a specific unit area in chronological order; and
a duplicate area extraction process of extracting a corresponding area as a duplicate area when an abrupt time difference is confirmed in at least some of time-series GPS coordinates.

5. The method according to claim 1, wherein the three-dimensional HD-map generation step includes:
a GPS coordinate collection process of collecting GPS coordinates for each movement;
a point cloud data collection process of collecting point cloud data for each movement;
a data matching process of confirming information of time zone by comparing time zones of the GPS coordinates and the point cloud data; and
a global coordinate application process of transforming matched point cloud data into matched GPS coordinates.

6. The method according to claim 5, wherein the correction value calculation step includes:
a target map determination process of determining any one to be compared among the three-dimensional HD-map of each movement as a target map;
a source map determination process of determining another one to be compared among the three-dimensional HD-map of each movement as a source map; and
a map matching process of matching the source map and the target map.

7. The method according to claim 6, wherein the correction value calculation step further includes, before the target map determination process, a standard deviation calculation process of calculating an average distance and a standard deviation of the point cloud data constituting the three-dimensional HD-map, wherein
the target map determination process determines a HD-map having a relatively small standard deviation, among the three-dimensional HD-maps of each movement to be compared, as a target map, and the source map determination process determines a HD-map having a relatively large standard deviation, among the three-dimensional HD-maps of each movement to be compared, as a source map.

8. The method according to claim 6, wherein the correction value calculation step further includes, between the source map determination process and the target map determination process, a preprocessing process of removing point cloud data of floor surface and point cloud data of noise among the point cloud data constituting the three-dimensional HD-map.

9. The method according to claim 6, wherein the map matching process includes:
a matching coordinate search process of searching for nearest GPS coordinates on the target map for all three-dimensional GPS coordinates on the source map; and
a matrix calculation process of calculating a 'Rotation' matrix and a 'Translation' matrix for transforming specific GPS coordinates of the source map into GPS coordinates of the target map that matches the specific GPS coordinates.

10. The method according to claim 9, wherein the correction value calculation step further includes a correction value calculation process of calculating X, Y, Z change values of the 'Translation' matrix among the calculated matrixes as a correction value for an error in the GPS coordinates.

* * * * *